United States Patent Office 3,308,847
Patented Mar. 14, 1967

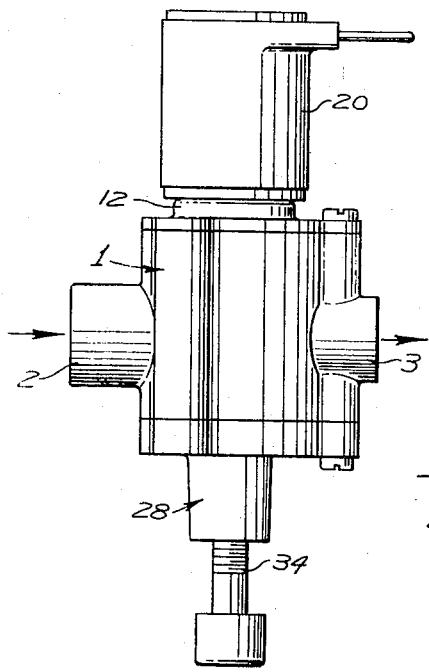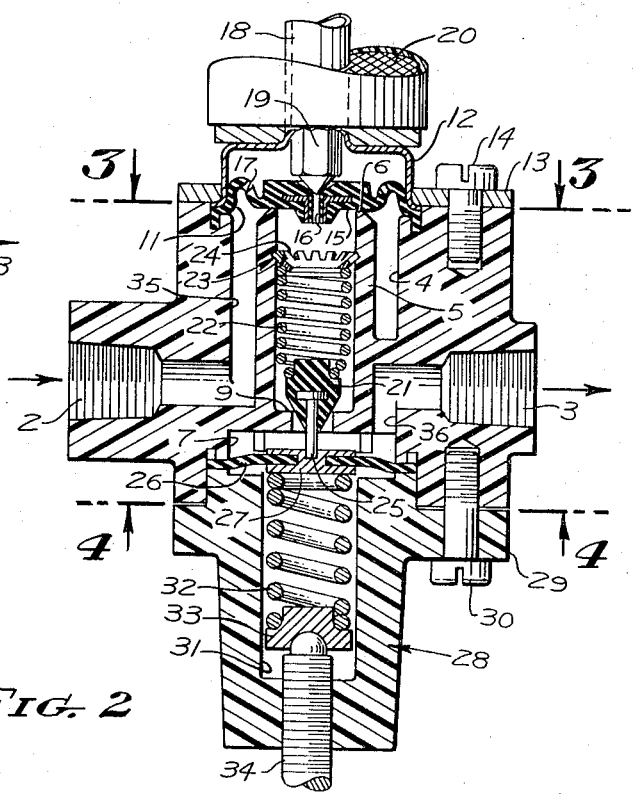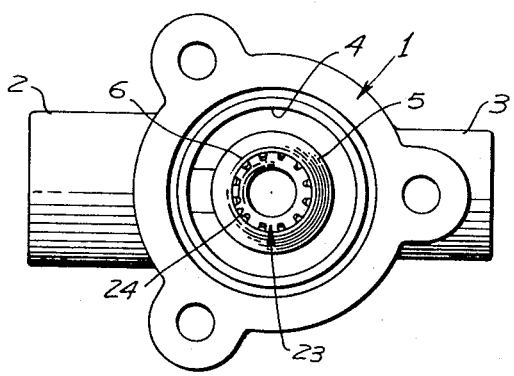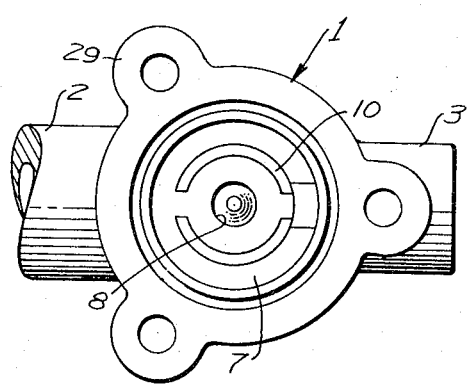
INVENTOR.
HARRY M. UMANN
BY
ATTORNEYS

3,308,847
SOLENOID-OPERATED, SHUT-OFF AND
REGULATOR VALVE
Harry M. Umann, Los Angeles, Calif., assignor, by mesne assignments, to Croname, Incorporated, Chicago, Ill., a corporation of Illinois
Filed Jan. 31, 1964, Ser. No. 341,794
1 Claim. (Cl. 137—613)

This invention relates to solenoid-operated, shut-off and regulator valves, and included in the objects of this invention are:

First, to provide a valve of this type which is particularly compact, and involves a minimum of parts of which the principal ones may be formed of plastic or elastomeric materials.

Second, to provide a solenoid-operated, shut-off and regulator valve wherein the shut-off and regulator valve elements are arranged in coaxial relation and share the same valve body.

Third, to provide a valve of this type which incorporates a novel valve body wherein the valve seats of both the shut-off and regulator valve portions are both integral with the valve body to make possible a simple, compact structure.

With the above and other objects in view, as may appear hereinafter, reference is directed to the accompanying drawings in which:

FIG. 1 is a side view of the solenoid-operated, shut-off and regulator valve;

FIG. 2 is an enlarged, longitudinal, sectional view thereof taken in a plane parallel with FIG. 1;

FIG. 3 is a top view of the valve body taken from 3—3 of FIG. 2 with the shut-off valve element removed;

FIG. 4 is a bottom view of the valve body taken from 4—4 of FIG. 2 with the regulator valve diaphragm removed.

The solenoid-operated, shut-off and regulator valve includes a valve body 1, preferably molded of plastic material, and having an inlet 2 and an outlet 3 disposed coaxially along a transverse axis. Disposed along an axis at right angles to the common axis of the inlet 2 and outlet 3, and intersecting one end of the valve body 1, is an annular shut-off valve chamber 4.

Centrally located in the chamber 4 is a tubular valve stem 5 which forms the inner wall of the annular chamber 4. Formed at the axially outer extremities of the stem 5 is a shut-off valve seat 6.

The end of the valve body 1 opposite from the annular chamber 4 is provided with a recess which forms a regulator valve chamber 7. Centered in the chamber 7 is a restricted port 8 which communicates with the bore of the tubular stem 5. At the intersection of the port 8 with the bore of the stem 5 there is formed a regulator valve seat 9. Formed around and radially outward from the port 8 are arcuate ribs 10 projecting into the regulator valve chamber 7.

The valve chamber 4 is covered by a shut-off valve diaphragm 11, formed of rubber or other elastomer, which is clamped at its margins by a cap 12 held in place by a retainer plate 13 secured by screws 14. The central portion of the diaphragm 11 forms a valve face 15 which engages the shut-off valve seat 6. The diaphragm 11 is provided with a central bleed port 16 communicating with the interior of the stem 5. At one side the diaphragm 11 is provided with an equalizer port 17.

Extending from the cap 12 is an armature tube 18 which receives an armature 19. The armature 19 normally engages and closes the bleed port 16, being urged thereagainst by a weak spring, not shown. The armature tube 18 is surrounded by a solenoid 20 for retracting the armature 19 from the bleed port 16.

Mounted within the tubular stem 5 for engagement with the regulator valve seat 9 is a regulator valve element 21 backed by a spring 22 guided by the walls of the tubular stem 5. The spring 22 is held in place by a retainer ring 23, preferably conical in form, having radial prongs 24 so that the retainer ring 23 may be forced into the tubular stem 5 and engage the walls thereof to hold the spring 22 in a compressed condition.

The regulator valve element 21 is provided with a central pin 25 which extends into the regulator valve chamber 7. The regulator valve chamber is covered by a regulator valve diaphragm 26 having a central disk 27 engageable with the pin 25. The regulator valve diaphragm 26 is peripherally secured by a cap 28 having side lugs 29, which receive screws 30 for attachment to the valve body 1.

Centered in the cap 28 is a socket 31 which receives a pressure regulating spring 32 capped by a bearing washer 33. The extremity of the cap 28 beyond the socket 31 is screw-threaded to receive a screw stem 34 which engages the bearing washer 33 to effect adjustment of the force exerted by the spring 32.

The shut-off valve chamber 4 and the regulator valve chamber 7 are connected by short axial passages 35 and 36, respectively, to the inlet 2 and outlet 3.

Operation of the solenoid-operated, shut-off and regulator valve is as follows:

Normally the armature 19 closes the bleed port 16 so that water entering the inlet 2 passes through the equalizer port 17 in order to exert a force across the entire area of the shut-off valve diaphragm 11 opposed only by the annular area of the chamber 4 so that the diaphragm 11 is held against the valve seat 6. When the solenoid 20 is energized, the armature 19 is lifted from the bleed port 16, relieving the pressure behind the diaphragm 11 so that it is free to open and permit flow of water into the tubular stem 5.

The regulator valve element 21 is normally held off its seat by reason of the fact that the force of the spring 32 is greater than the force of the spring 22. However, due to the resistance in the flow line downstream of the outlet 3, back pressure is applied to the regulator valve diaphragm 26 so that a downstream pressure is maintained, the value of which is determined by the pressure regulator spring 32.

While a particular embodiment of this invention has been shown and described, it is not intended to limit the same to the exact details of the construction set forth, and it embraces such changes, modifications, and equivalents of the parts and their formation and arrangement as come within the purview of the appended claim.

What is claimed is:

A shut-off and regulator valve, comprising:
 (a) a valve body, defining at one end a shut-off valve chamber having an annular inlet cavity, a central outlet cavity, and an annular valve seat therebetween, and defining at its opposite end a regulator valve chamber having a central inlet coaxial with the axis of said outlet cavity, and an outlet at one side of said inlet;
 (b) a shut-off valve diaphragm closing said inlet cavity and engageable with said valve seat to shut off flow to said outlet cavity;
 (c) means for effecting movement of said shut-off valve diaphragm;
 (d) a regulator valve element within said outlet cavity and engageable with the inlet of said regulator valve chamber;

(e) a spring within said outlet cavity urging said valve element toward its closed position;

(f) a frusto conical disk having peripherial wall penetrating elements, said retainer disk being axially movable into said outlet cavity to engage and compress said spring, said penetrating elements preventing movement of said retainer disk out of said outlet cavity;

(g) a regulator valve diaphragm closing said regulator valve chamber and engageable with said valve element;

(h) a spring backing said regulator valve diaphragm;

(i) and means for adjusting the force of said spring.

References Cited by the Examiner

UNITED STATES PATENTS

| 2,335,824 | 6/1940 | Dillman | 137—614.21 |
| 2,863,628 | 3/1955 | Rimsha | 251—45 |
| 3,189,047 | 6/1965 | Puster | 137—614.21 |

FOREIGN PATENTS

| 1,071,622 | 12/1959 | Germany. |

WILLIAM F. O'DEA, *Primary Examiner.*

HOWARD COHN, *Assistant Examiner.*